(12) United States Patent  
Jouper

(10) Patent No.: US 8,053,925 B2
(45) Date of Patent: Nov. 8, 2011

(54) MODULATION MONITOR AND CONTROL

(75) Inventor: Jeffrey A. Jouper, Renton, WA (US)

(73) Assignee: Astronics Advanced Electronic Systems Corp., Redmond, WA (US)

(*) Notice: Subject to any disclaimer, the term of this patent is extended or adjusted under 35 U.S.C. 154(b) by 379 days.

(21) Appl. No.: 12/365,257

(22) Filed: Feb. 4, 2009

(65) Prior Publication Data

US 2010/0194196 A1   Aug. 5, 2010

(51) Int. Cl.
*H02J 3/14* (2006.01)
(52) U.S. Cl. .......................................................... 307/39
(58) Field of Classification Search .................... 307/38, 307/39, 11; 700/286, 294, 295
See application file for complete search history.

(56) References Cited

U.S. PATENT DOCUMENTS

| | | | |
|---|---|---|---|
| 4,090,088 A | 5/1978 | McMahon et al. | |
| 4,206,443 A | 6/1980 | Britton | |
| 4,868,412 A | 9/1989 | Owens | |
| 5,621,627 A * | 4/1997 | Krawchuk et al. | 363/37 |
| 5,754,445 A | 5/1998 | Jouper et al. | |
| 5,886,422 A * | 3/1999 | Mills | 307/29 |
| 6,046,513 A | 4/2000 | Jouper et al. | |
| 6,188,314 B1 * | 2/2001 | Wallace et al. | 340/438 |
| 6,762,577 B2 * | 7/2004 | Gray et al. | 318/268 |
| 7,183,811 B2 * | 2/2007 | Horie et al. | 327/63 |
| 7,911,189 B2 * | 3/2011 | Seberger et al. | 323/222 |
| 2004/0021371 A1 | 2/2004 | Jouper | |
| 2006/0106503 A1 | 5/2006 | Lamb et al. | |

FOREIGN PATENT DOCUMENTS

EP      1 028 512 A2   8/2000

* cited by examiner

*Primary Examiner* — Albert W Paladini
(74) *Attorney, Agent, or Firm* — Wiggin and Dana LLP

(57) ABSTRACT

A system and method are provided for monitoring and controlling voltage modulation on a power grid, in order to maintain closed-loop control of the grid. The power grid has a plurality of connections including used and unused connections. A detector is configured to detect a modulation voltage on the power grid. A controller is configured to receive signals from the detector, and to control connections to the power grid. The controller disables power to unused connections in accordance with the modulation voltage exceeding a first threshold and disables power to used connections in accordance with the modulation voltage exceeding a second threshold; used connections are disabled one at a time at a first time interval each for a period given by a second time interval. The controller also restores power to the connections in accordance with the detected modulation voltage being less than a third threshold.

28 Claims, 19 Drawing Sheets

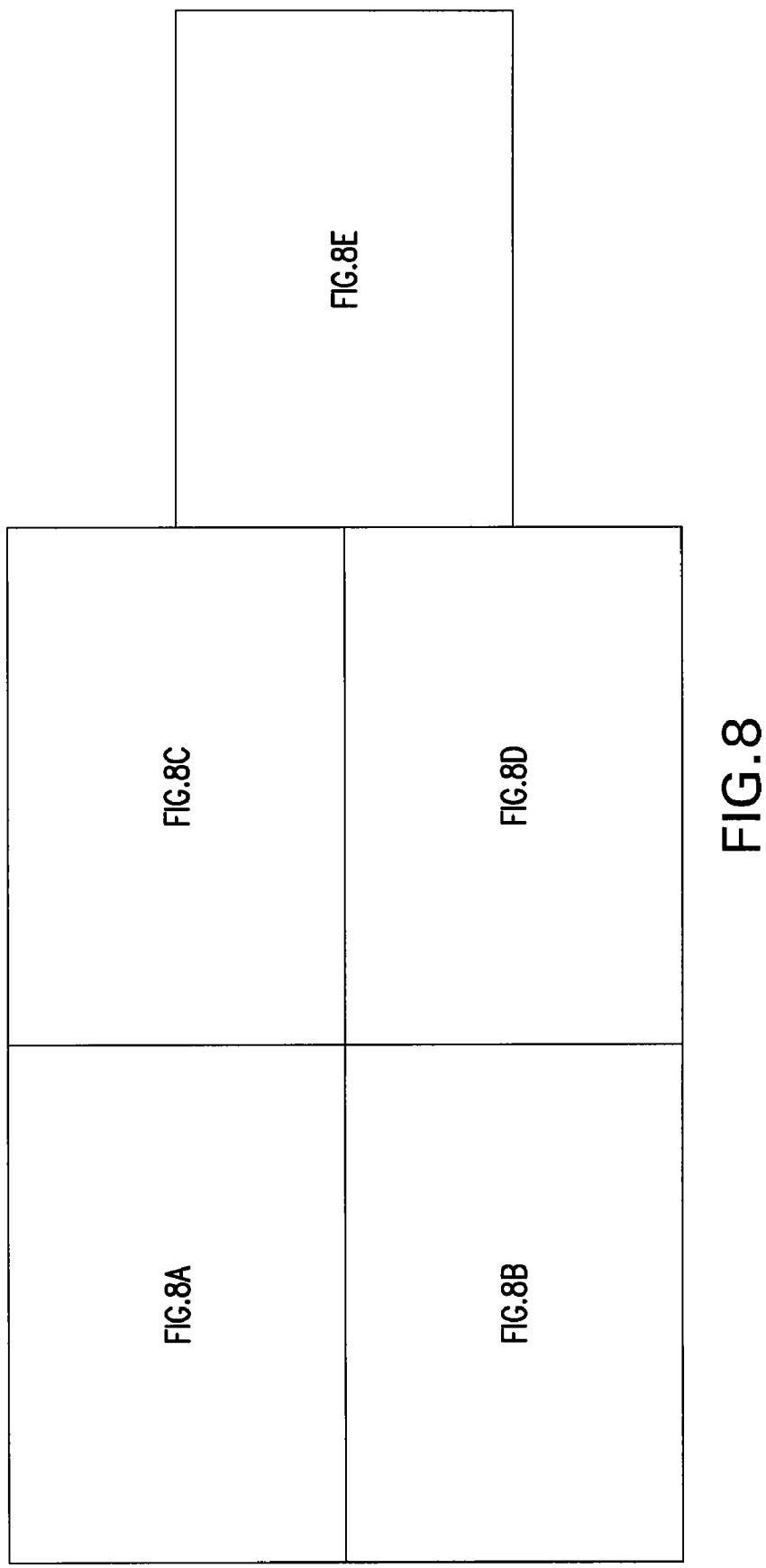

MODULATION MONITOR AND CONTROL

FIELD OF THE DISCLOSURE

This disclosure relates to a system for monitoring and controlling loads attached to a power system, and more particularly to a system for monitoring and controlling loads where available power is limited, such as an onboard power system for an aircraft.

BACKGROUND OF THE DISCLOSURE

In limited power systems (including, but not limited to, power systems on an aircraft), a closed loop control system is often implemented to control the output voltage of a generator to ensure proper operation of devices attached to the power system.

A typical closed loop control system for power generation is shown schematically in FIG. 1. The system has a generator 11 and a reference sensor 12, which senses the output 13 and provides a reference signal 14 fed back to the generator. The output is connected to a load 15. The reference signal has a finite frequency response to allow for control of the output. As the output changes, the reference sensor adjusts the generator to remain at a constant output.

A critical point may be reached in a closed loop system where the input impedance $Z_{in}$ of the load 15 is lower than the output impedance $Z_{out}$ of the generator 11. In this case, the system can revert from closed loop control to open loop control and possibly into sub-harmonic oscillation or modulation of the output voltage.

The onboard power generation system for a modern passenger aircraft must accommodate different types of loads. In the case of galleys, heaters, air conditioners, etc. the load is resistive, so that a decrease in the voltage input to the load causes a decrease in the load current. In contrast, inflight entertainment (IFE) systems and other electronic systems generally have a reactive load with a negative impedance or constant power characteristic, so that as the generator voltage decreases the load current increases. As the IFE system load increases, the impedance $Z_{in}$ decreases, and may become lower than the output dynamic impedance $Z_{out}$ of the generator. When this happens, the generator can go into a "hunting" mode in an attempt to regain closed loop control. This behavior typically presents itself as a voltage modulation about the mean of the voltage set point, characterized by a voltage modulation envelope.

The power generating system may be designed to tolerate a certain modulation envelope size (maximum voltage peak to valley). The modulation may be successfully limited as long as the load remains within the boundaries for closed loop control. Accordingly, it is desirable to implement a modulation monitor and control system to control the load, limit the modulation envelope, and thereby ensure that the system stays within operational boundaries.

SUMMARY OF THE DISCLOSURE

The present disclosure provides a system and method for monitoring and controlling the voltage modulation on a power grid, in order to maintain closed-loop control of the grid. The power grid has a plurality of connections including unused connections to which a load is not connected and used connections to which a load is connected.

According to a first aspect of the disclosure, a system is provided which includes a detector and a controller. The detector is configured to detect a modulation voltage on the power grid. The controller is configured to receive signals from the detector, and to control connections to the power grid. The controller disables power to the unused connections in accordance with the detected modulation voltage exceeding a first threshold and disables power to the used connections in accordance with the detected modulation voltage exceeding a second threshold; the used connections are disabled in sequence at a first time interval each for a period given by a second time interval. The controller also restores power to the used connections and to the unused connections in accordance with the detected modulation voltage being less than a third threshold.

According to another aspect of the disclosure, a method for maintaining closed-loop control of a power grid includes the steps of: detecting a modulation voltage on a power grid; disabling power to the unused connections in accordance with the detected modulation voltage exceeding a first threshold; and disabling power to the used connections in accordance with the detected modulation voltage exceeding a second threshold. The used connections are disabled one at a time at a first time interval each for a period given by a second time interval. The method also includes the step of restoring power to the used connections and to the unused connections in accordance with the detected modulation voltage being less than a third threshold.

According to an additional aspect of the disclosure, a system is provided which includes a detector and a timer control circuit. The detector is configured to detect a modulation voltage on a power grid. The timer control circuit is configured to receive signals from the detector and to control connections to the power grid by causing power to the unused connections to be disabled in accordance with the detected modulation voltage exceeding a first threshold, and causing power to the used connections to be disabled in accordance with the detected modulation voltage exceeding a second threshold.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

BRIEF DESCRIPTION OF THE DRAWINGS

FIG. 8 is a block diagram showing that FIGS. 8A-8E are to be read as connected diagrams.

DETAILED DESCRIPTION

Figure 1:
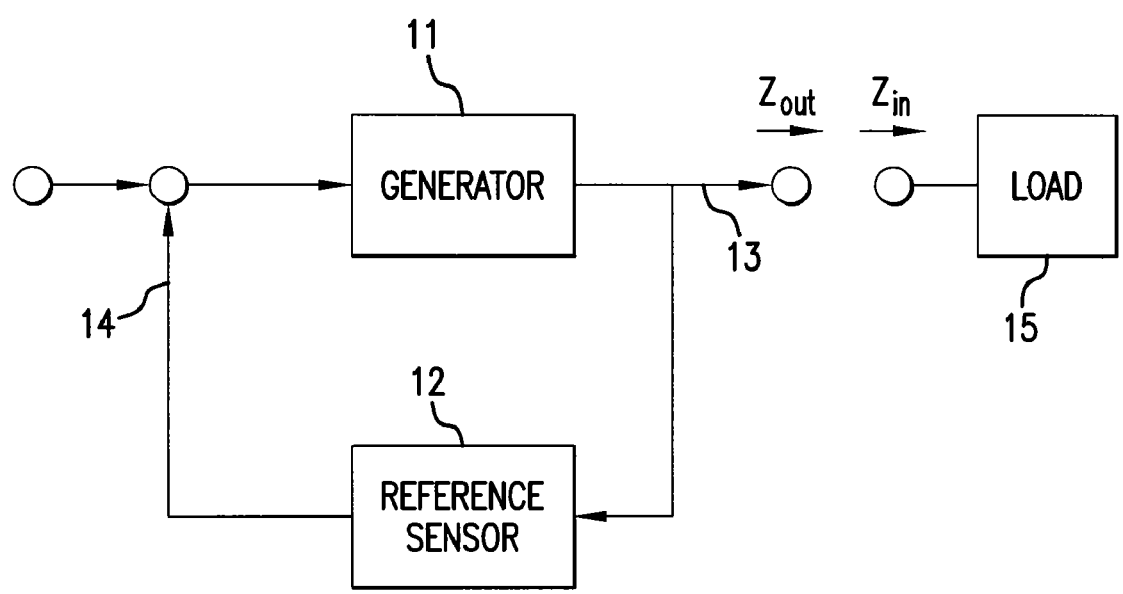
FIG. 1 is a schematic illustration of a typical closed loop control system for power generation.
Figure 2:
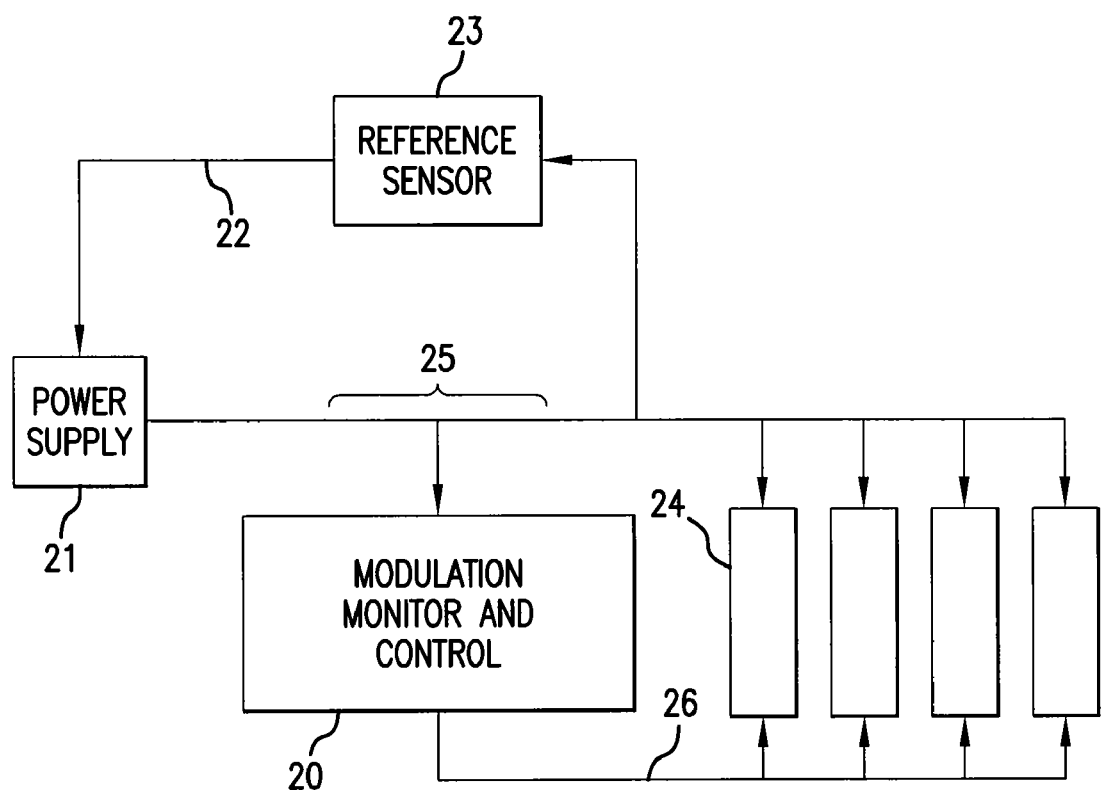
FIG. 2 is a schematic block diagram of a power generation system including a power grid, loads, and a modulation monitor and control unit (MMCU), in accordance with the disclosure.

FIG. 2 illustrates a power generation system with closed loop control and including a modulation monitoring and control unit (MMCU) 20. Power supply 21 delivers power to grid 25 and receives feedback 22 from reference sensor 23. The power grid has a plurality of connections, including unused connections to which a load is not connected and used connections to which a load is connected. The MMCU monitors the voltage output to loads 24 at various used connections on the grid (four shown in FIG. 2, as an example), to detect voltage modulation about the voltage set point; the amount of modulation serves as an indication of degradation in performance of the system. The MMCU outputs a control signal 26 to either prevent a load from being added to the grid or disconnect an existing load from the grid, in order to bring the system back under control.

Figure 3:
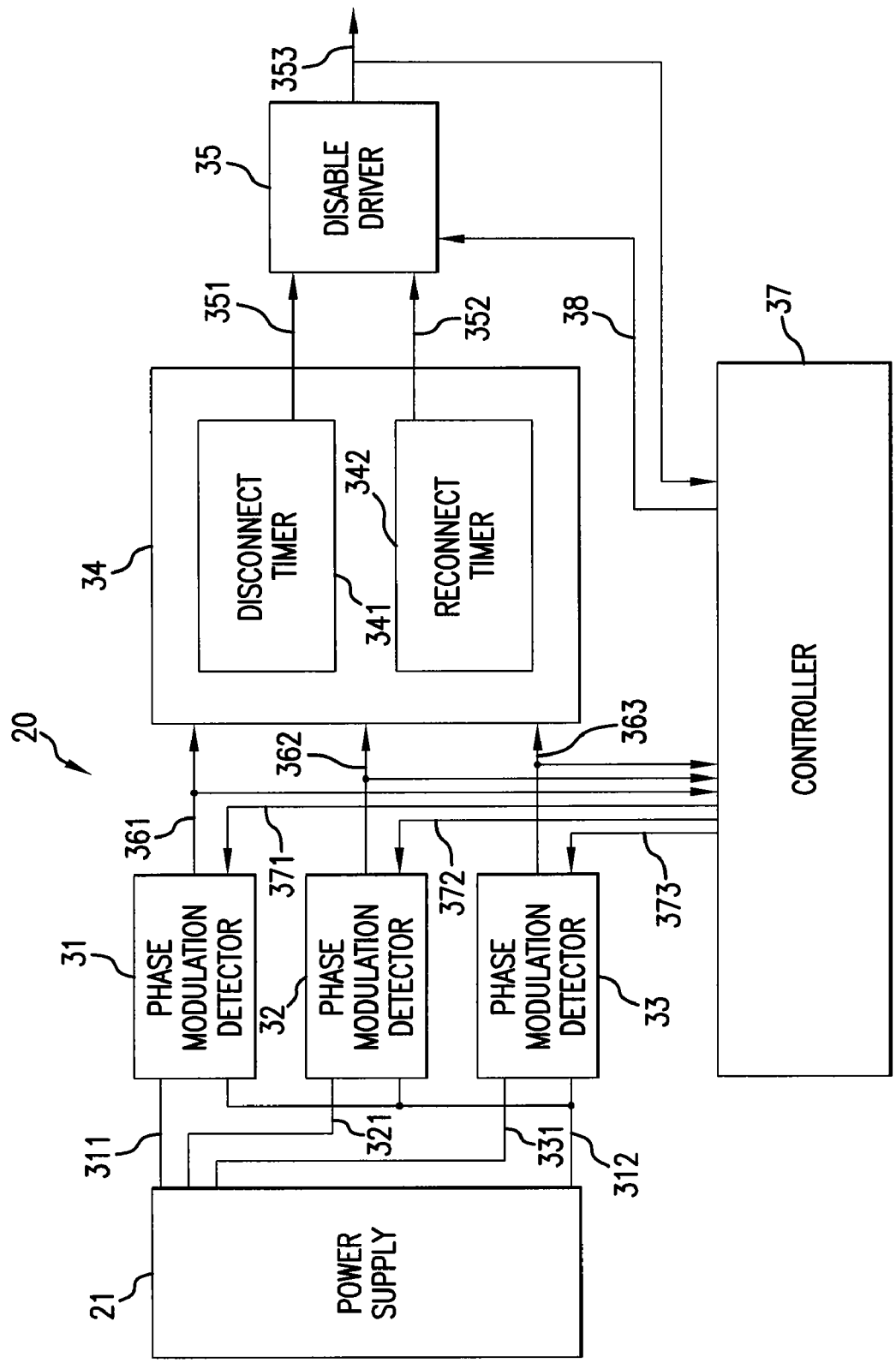
FIG. 3 is a schematic block diagram of a modulation monitor and control unit (MMCU) in accordance with an embodiment of the disclosure.

FIG. 3 is a schematic block diagram of the MMCU 20 showing components thereof, in accordance with an embodiment of the disclosure. In this embodiment, power supply 21 outputs 3-phase AC line voltage; voltage signals 311, 321, 331 of the three phases are input to phase modulation detectors 31, 32, 33 respectively, along with neutral input 312. Phase modulation detectors 31-33 determine the amount of voltage modulation in each phase; a signal 361-363 corresponding to the modulation is output to a timer control circuit 34.

Timer control circuit 34 includes a disconnect timer 341 and a reconnect timer 342. Disconnect timer 341 has a preset timing step (e.g. between 1 and 15 seconds) defining a time interval for disabling a load. If one or more signals 361-363 indicate that any of the three phases has a modulation greater than a defined threshold, disconnect timer 341 causes a SET signal 351 to be input to a disable driver circuit 35. Disable driver circuit 35 outputs a DISABLE signal 353 to disable loads successively at the preset disconnect interval, to bring the modulation back below the threshold value. Reconnect timer 342 has another preset timing step (e.g. between 1 and 15 minutes) defining a time interval for reconnecting a load. If signals 361-363 indicate that all of the three phases have been restored to a modulation less than the defined threshold, reconnect timer 342 causes a RESET signal 352 to be input to disable driver circuit 35. Disable driver circuit 35 outputs a REENABLE signal to reconnect loads successively at the preset reconnect interval. In this embodiment, loads are reconnected in the reverse order of disconnection (last off, first on).

Controller 37 is configured to perform a confidence test of the system (built-in test or BITE). In an embodiment, controller 37 sends modulated voltage signals (self-test signals) 371-373 to phase modulation detectors 31-33, monitors signals 361-363, and modifies the timers 341, 342 to speed up the disconnect and reconnect processes. Controller 37 sends a signal 38 to reset the disable driver 35 if the test is successful. The BITE test may be performed when the system is turned on and/or by an external command.

Figure 4:
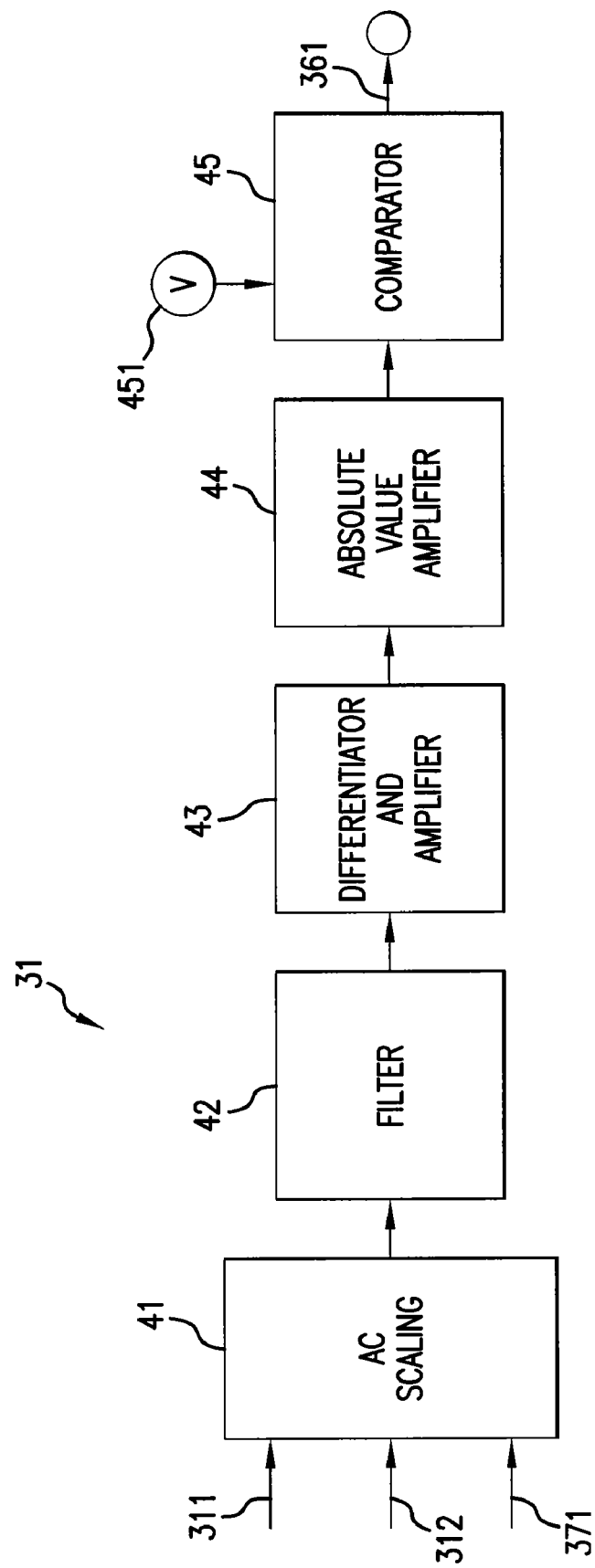
FIG. 4 is a schematic block diagram of a modulation detection circuit in an MMCU, in accordance with an embodiment of the disclosure.
Figure 5:
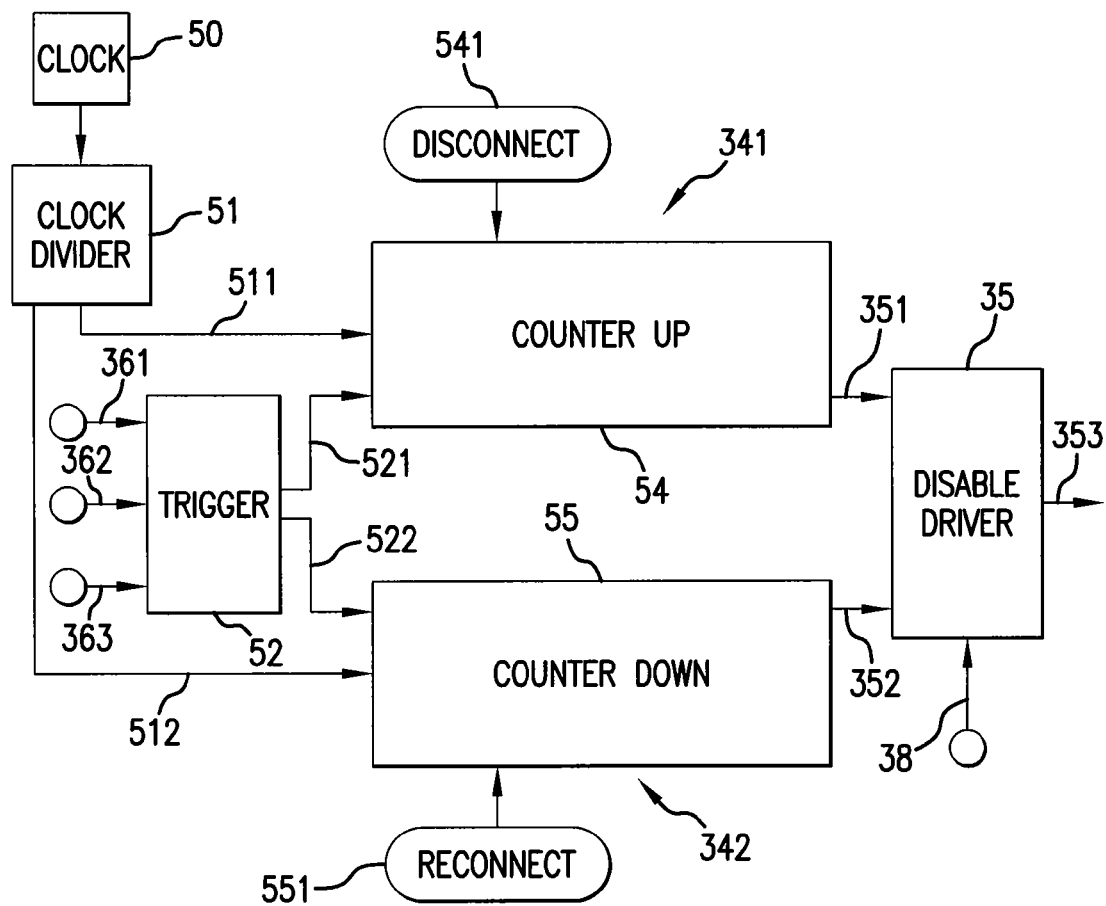
FIG. 5 is a schematic block diagram of a timer control circuit in an MMCU, in accordance with an embodiment of the disclosure.

Further details of the phase modulation detectors 31-33 and the timer control 34, according to particular embodiments of the disclosure, are shown in FIGS. 4 and 5 respectively.

As shown schematically in FIG. 4, each phase modulation detector (e.g. detector 31) has an AC scaling circuit having as inputs the AC phase 311, neutral 312 and self-test signal 371. Circuit 41 scales the AC line voltage through a voltage divider. The line voltage phase signal is then processed though a filter (for example, a 6th order filter 42), to effectively remove the input carrier frequency from the voltage modulation (the voltage modulation being the signal of interest). The voltage modulation is input to a differentiator and high gain amplifier circuit 43. The output of circuit 43 is connected to an absolute value amplifier 44, which is connected to a comparator circuit 45. The comparator circuit monitors the voltage modulation for a value greater than a reference voltage 451 (the modulation threshold); if the modulation voltage exceeds the threshold, the comparator circuit outputs signal 361 to trigger the timer control circuit 34.

As shown schematically in FIG. 5, the timer control circuit 34 includes clock divider 51, trigger circuit 52, disconnect timer 341 and reconnect timer 342. The timer control circuit is connected to the disable driver circuit 35, which outputs DISABLE signals to remove a load from the grid and REENABLE signals to reconnect a load to the grid.

A master clock 50 provides a clock signal (typically at 32 KHz) to clock divider circuit 51. This circuit then sends a timer signal 511 corresponding to a disconnect interval (e.g. 1 second) to disconnect timer 341, and a timer signal 512 corresponding to a reconnect interval (e.g. 56 seconds) to reconnect timer 342. Signals 511 and 512 are used to control the UP/DOWN count function of timers 341, 342 respectively.

Trigger circuit 52 receives as inputs signals 361-363 from the phase modulation detector circuits 31-33, and has outputs 521, 522 connected to timers 341, 342.

Disconnect timer 341 includes an UP counter 54 that counts time intervals, in accordance with disconnect settings 541 and input 511 from clock divider circuit 51. When a voltage modulation greater than the threshold exists in any of the three phases, the UP counter 54 is triggered; depending on the disconnect settings, DISABLE signals 353 will be activated one at a time in steps from 1-15 seconds per step.

Reconnect timer 342 includes a DOWN counter 55 that counts time intervals, in accordance with reconnect settings 551 and input 512 from clock divider circuit 51. When the voltage modulation falls below the threshold for all of the phases, a REENABLE signal will be activated to reconnect loads to the power grid in the opposite order (last off, first on) in approximately 1-15 minute intervals as set by the reconnect settings 551.

The reconnect timer 342 may be viewed as an optional circuit, since a reconnect feature may not be desirable in all cases. Another embodiment, where the reconnect timer is not used, is discussed below with reference to FIG. 10.

Figure 6A:
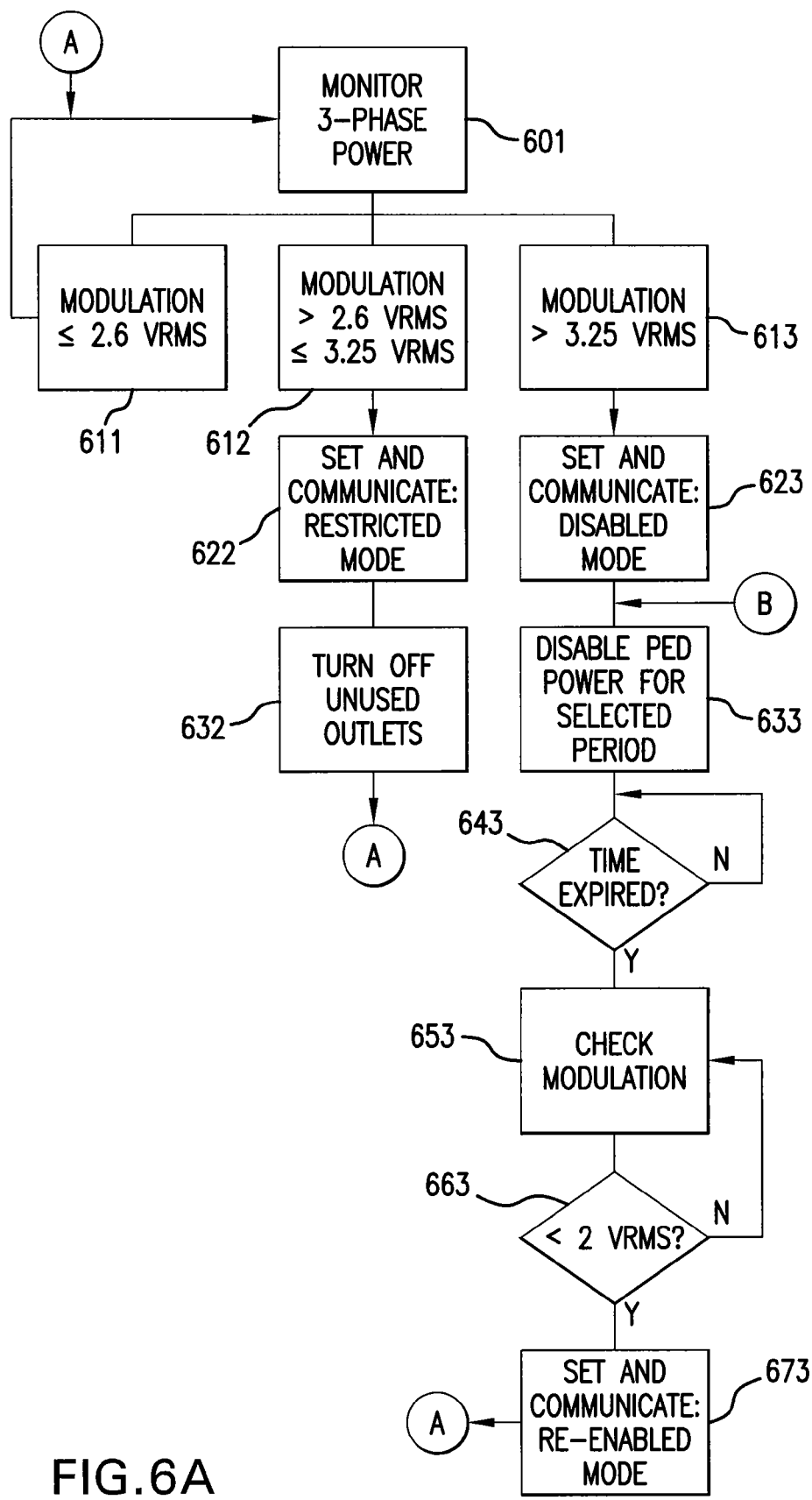
FIGS. 6A and 6B are connected flowcharts showing a modulation control procedure and test procedure using an MMCU in accordance with an embodiment of the disclosure.
Figure 6B:
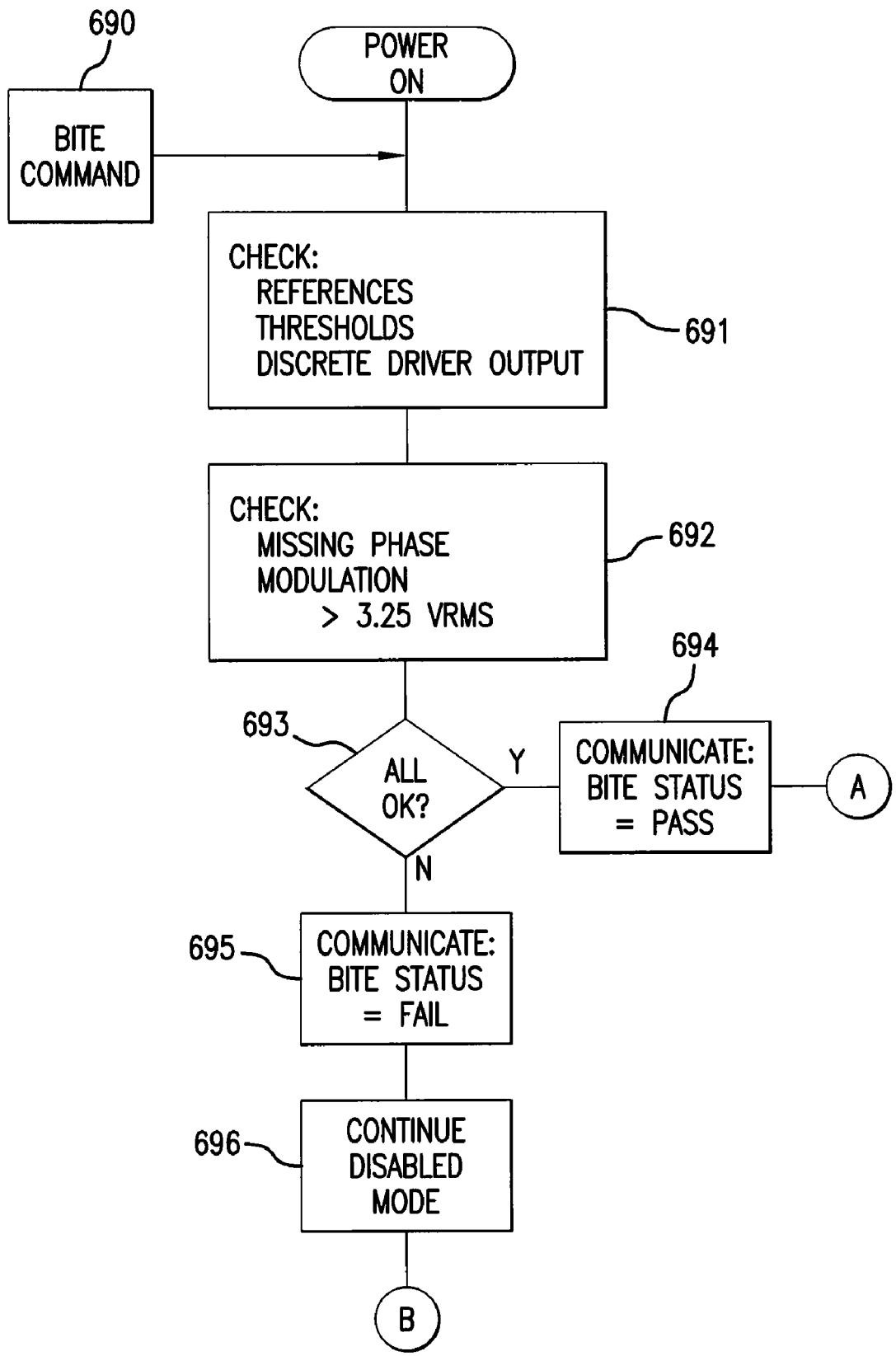

FIGS. 6A and 6B show steps in a monitoring and control procedure and a test procedure, respectively, in accordance with an embodiment. In this exemplary embodiment, a power grid on an aircraft has an IFE system with a plurality of connections, and a passenger entertainment device (PED)

with a reactive load may be plugged into any of the connections. In order to maintain closed-loop control of the power grid, aircraft specifications require that one or more such loads must be disconnected if the voltage modulation exceeds a specified maximum value (in this example, 3.25 VRMS).

In the monitoring and control procedure, the three phases are monitored for voltage modulation (step 601). The frequency of modulation may vary from about 1 Hz to about 20 Hz. The disconnect time interval is settable (via disconnect settings 541) at a time from about 1 second to about 15 seconds. The reconnect time interval is settable (via reconnect settings 551) at a time from about 1 minute to about 15 minutes.

Normal operation 611 is characterized by a voltage modulation not greater than 2.6 VRMS. If the voltage modulation exceeds this value, but is less than the maximum permitted value (3.25 VRMS in this example; step 612), a RESTRICTED mode is set; this condition is communicated via a communication interface (step 622). In the restricted mode, unused connections on the grid are turned off, but connections in use are not affected (step 632).

If the voltage modulation increases to a value greater than 3.25 VRMS (step 613), a DISABLED mode is set and communicated (step 623). Power to the PEDs is disabled (step 633), one connection at a time and at the set interval (between 1 and 15 seconds), for the selected period (between 1 and 15 minutes).

When the reconnect time period expires (step 643), and if the voltage modulation has decreased to less than 2 VRMS (steps 653, 663), the ENABLED mode is set and communicated (step 673). The disabled power connections are re-enabled in reverse order to their being disabled. Unused connections, previously turned off, are turned on again.

Steps in a self-test (BITE) procedure, performed at power on or by an external command 690 from a user of the system, are shown in FIG. 6B. The controller checks the voltage references, thresholds, and discrete driver output (step 691). The system is checked for a missing phase and for a modulation in any phase of greater than 3.25 VRMS (step 692). The system is held in the DISABLED mode until the test is successful.

If the test is successful (step 693), a BITE status of PASS is communicated (step 694); signal 38 resets the disable driver circuit 35. If the test is not successful, a BITE status of FAIL is communicated (step 695), and the system continues in the DISABLED mode (step 696).

Figure 7:
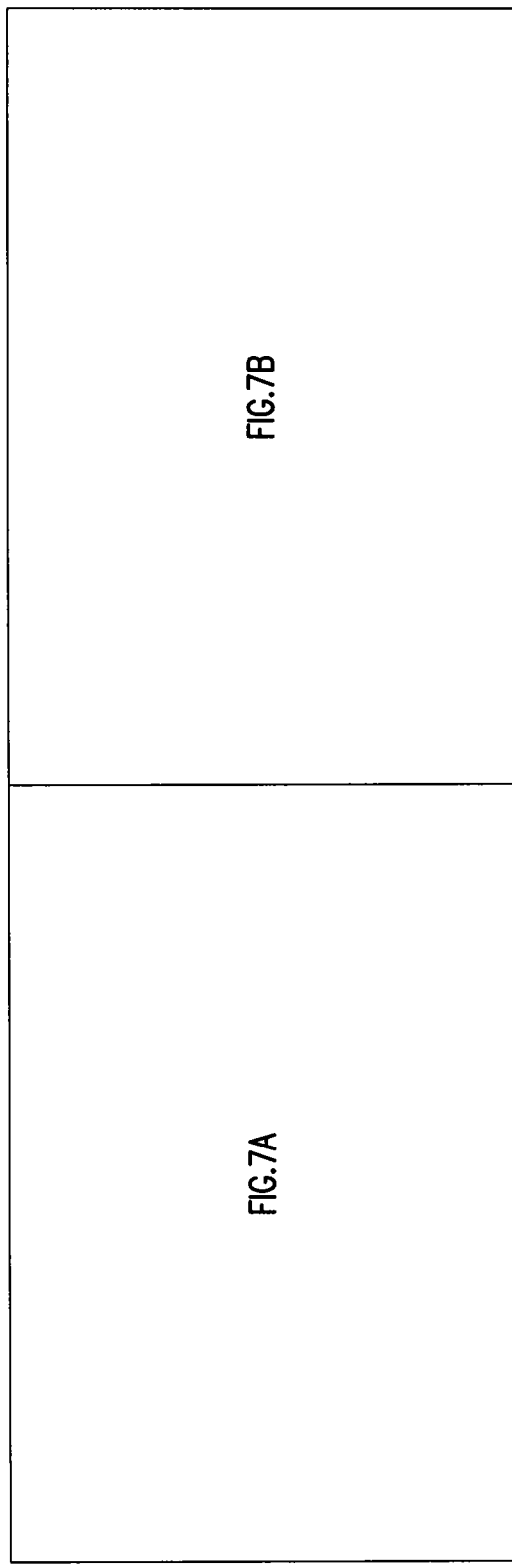
FIG. 7 is a block diagram showing that FIGS. 7A-7C are to be read as connected diagrams.
Figure 7:
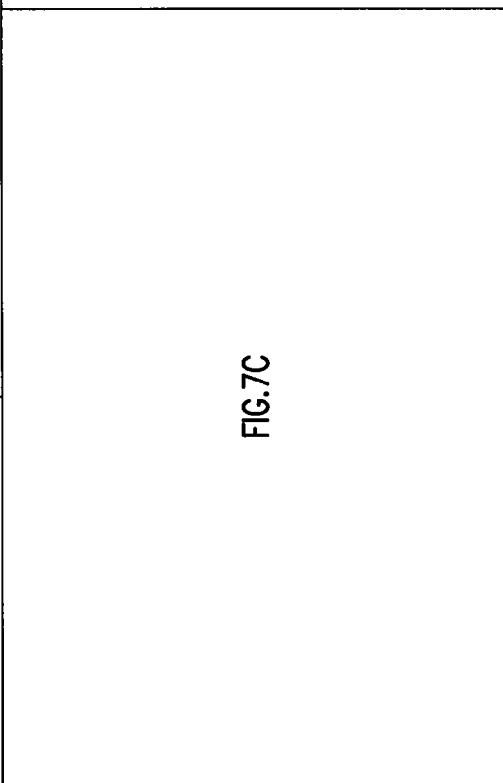
Figure 7A:
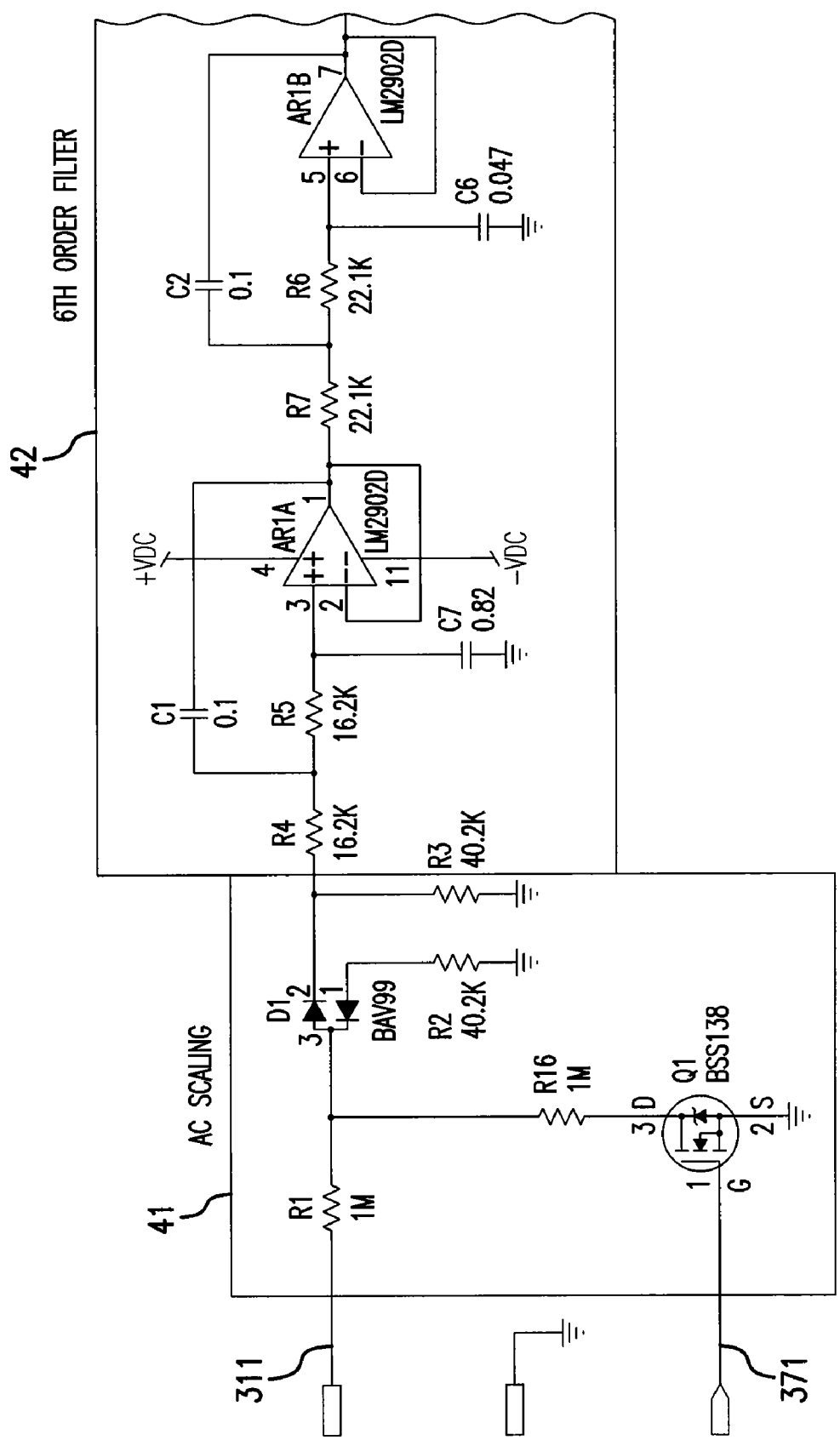
FIGS. 7A-7C each show a portion of a schematic circuit diagram for a modulation detection circuit in an MMCU embodying the disclosure.
Figure 7B:
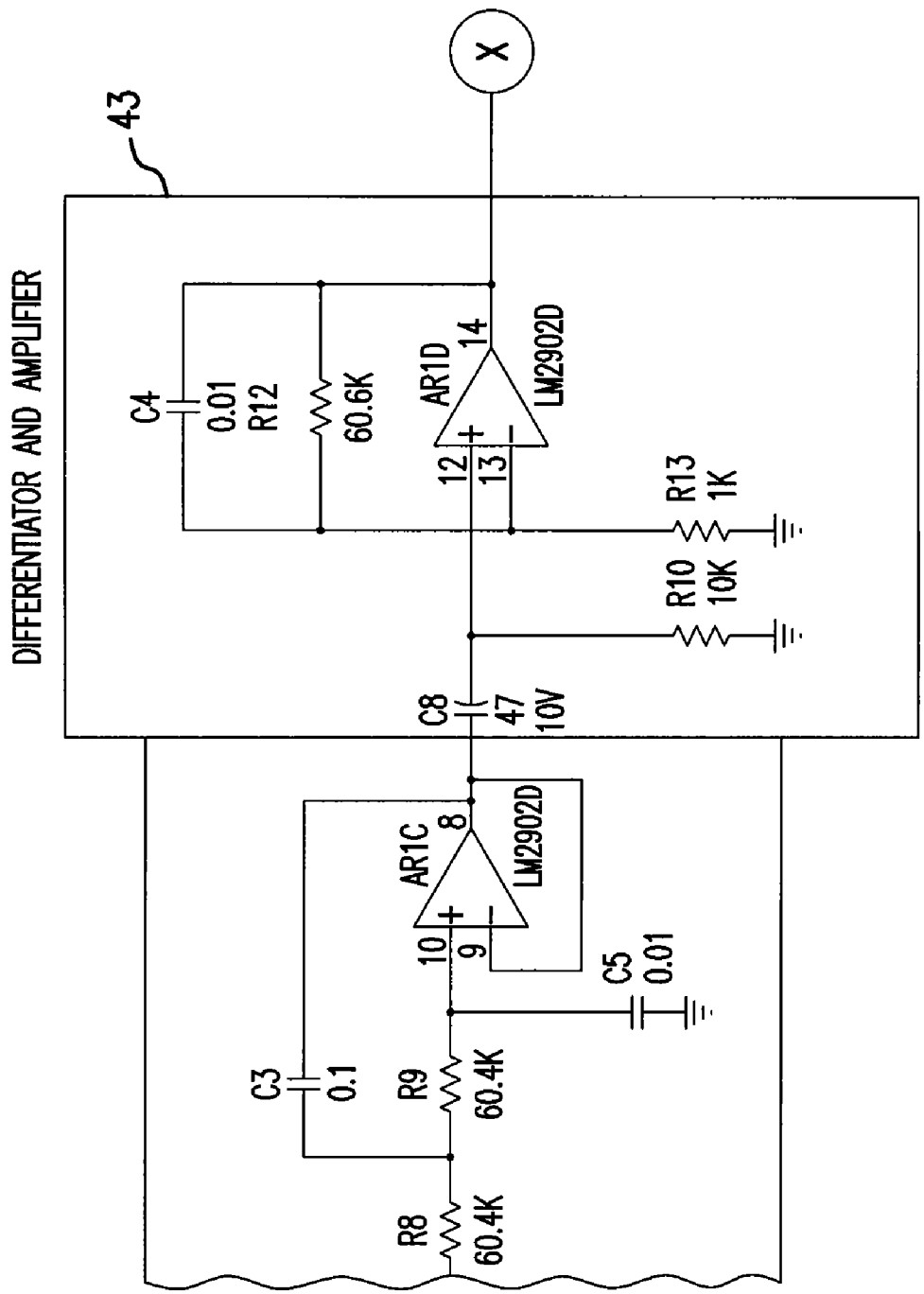
Figure 7C:
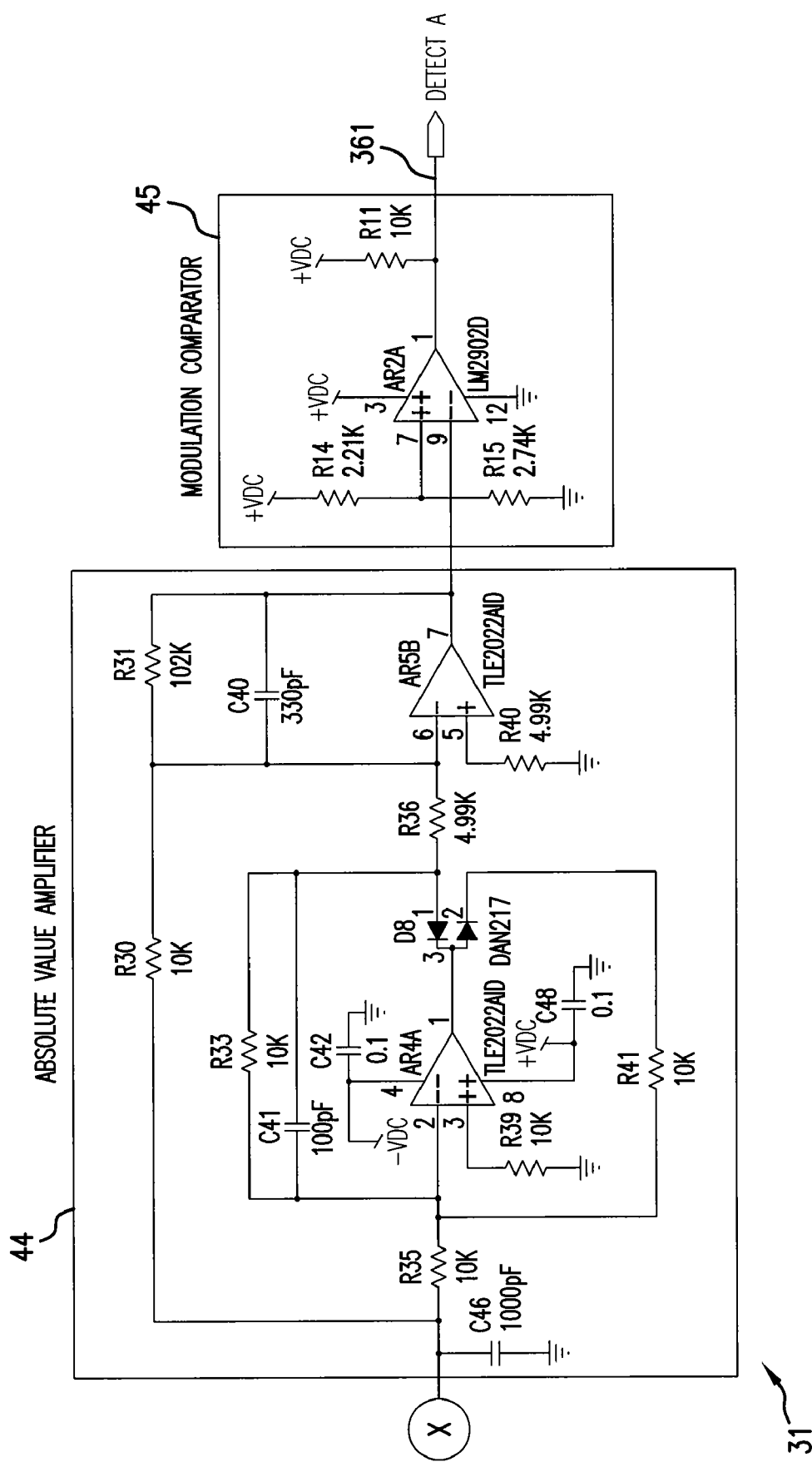
Figure 8A:
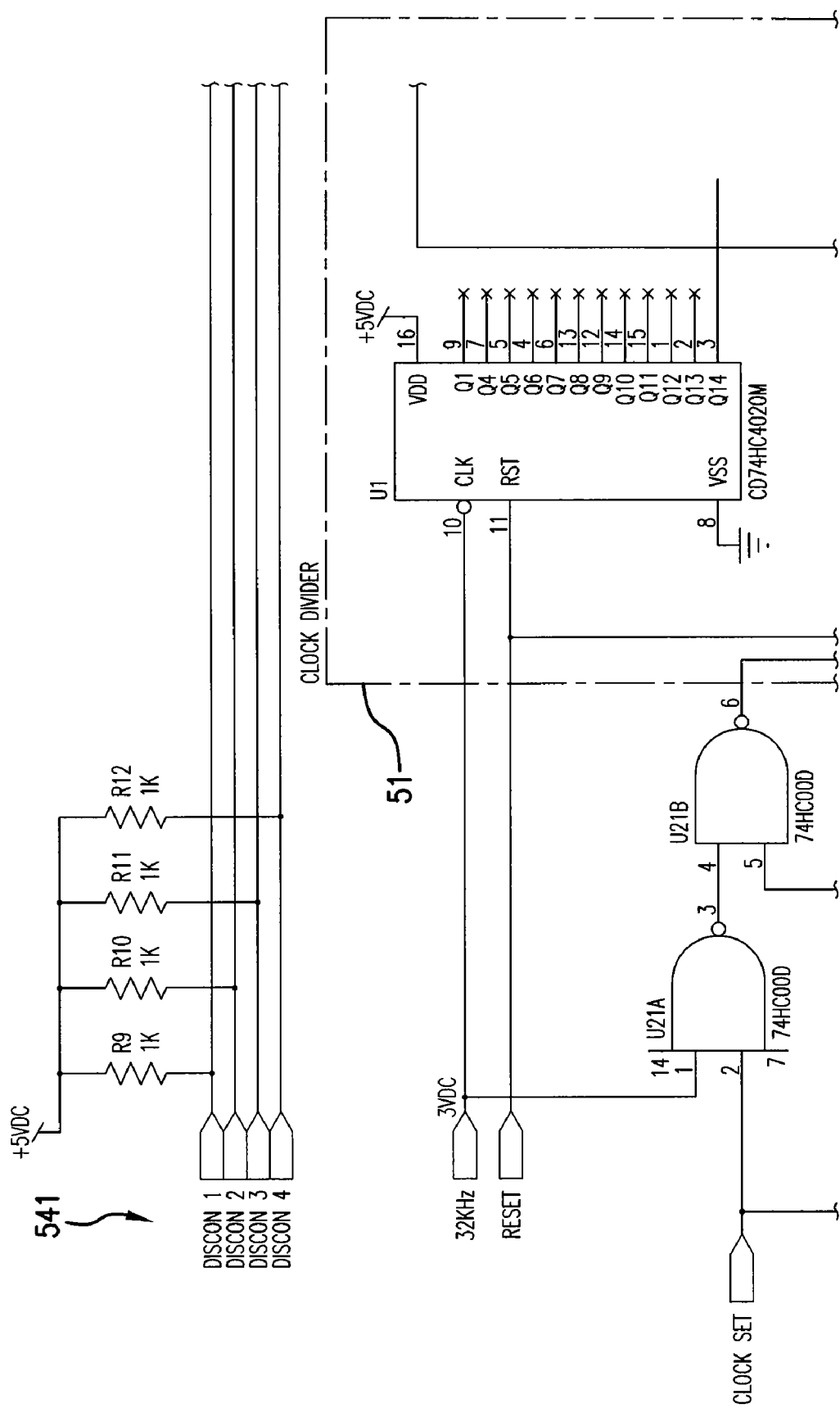
FIGS. 8A-8E each show a portion of a schematic circuit diagram for a timer control circuit in an MMCU embodying the disclosure.
Figure 8B:
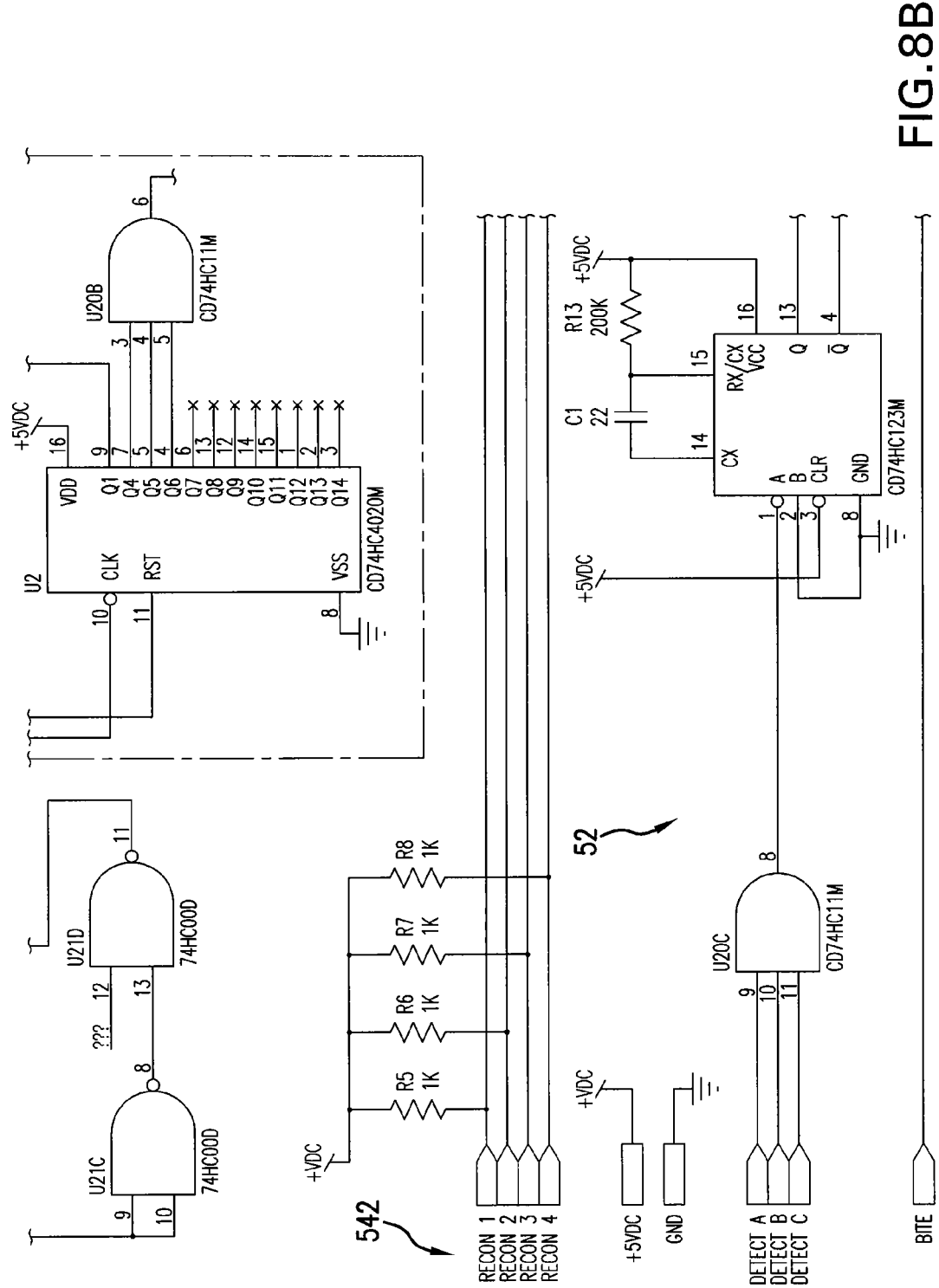
Figure 8C:
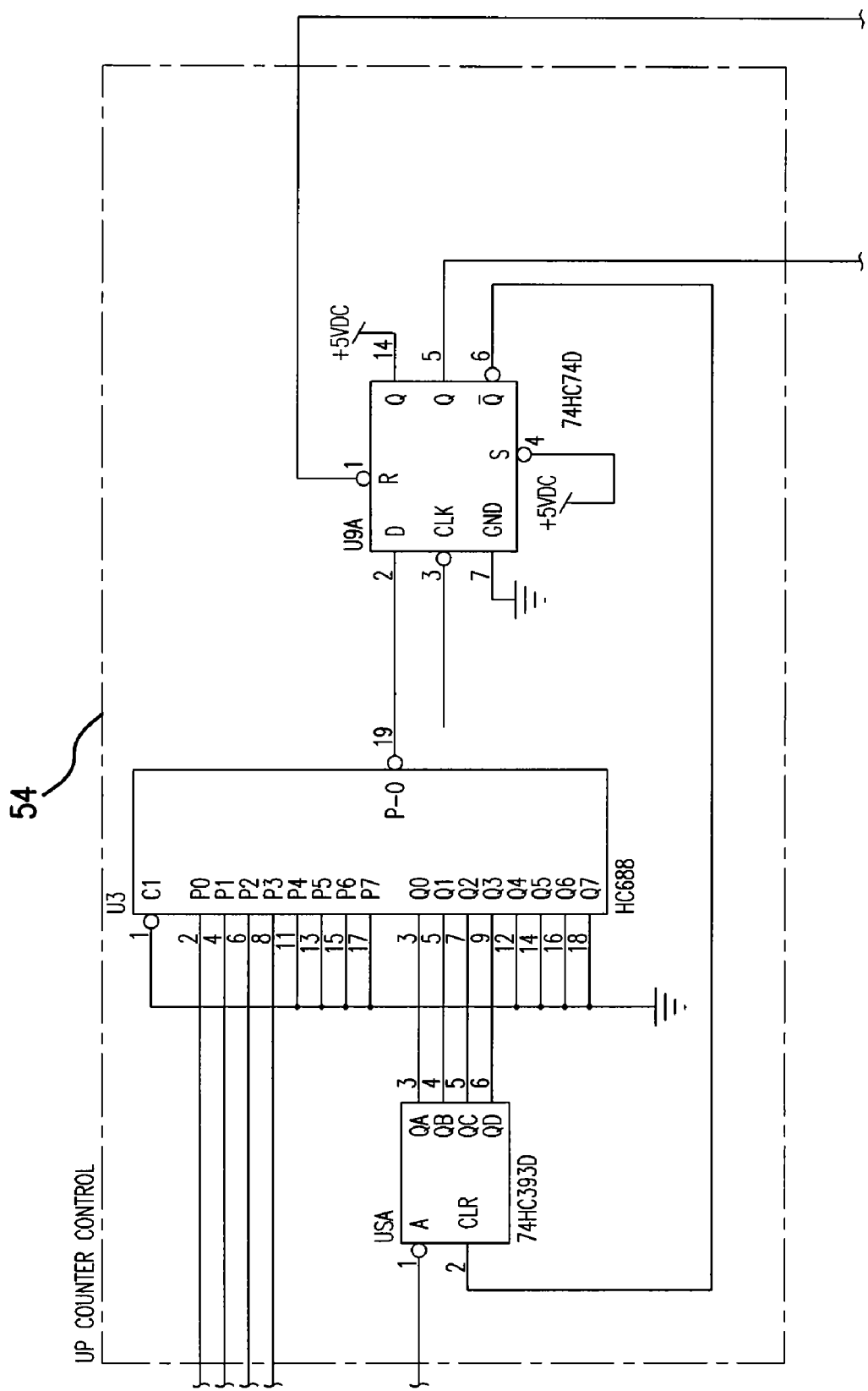
Figure 8D:
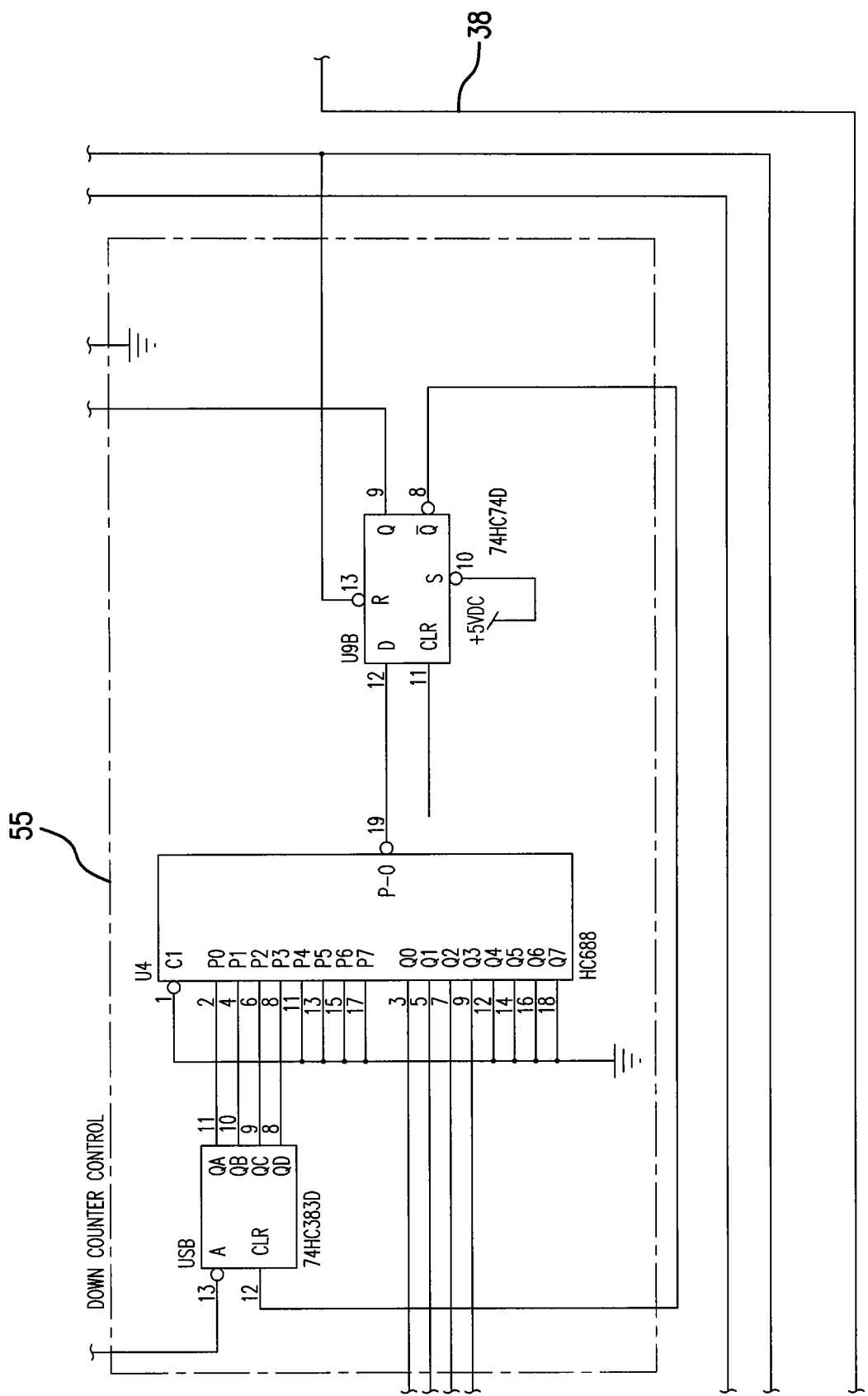
Figure 8E:
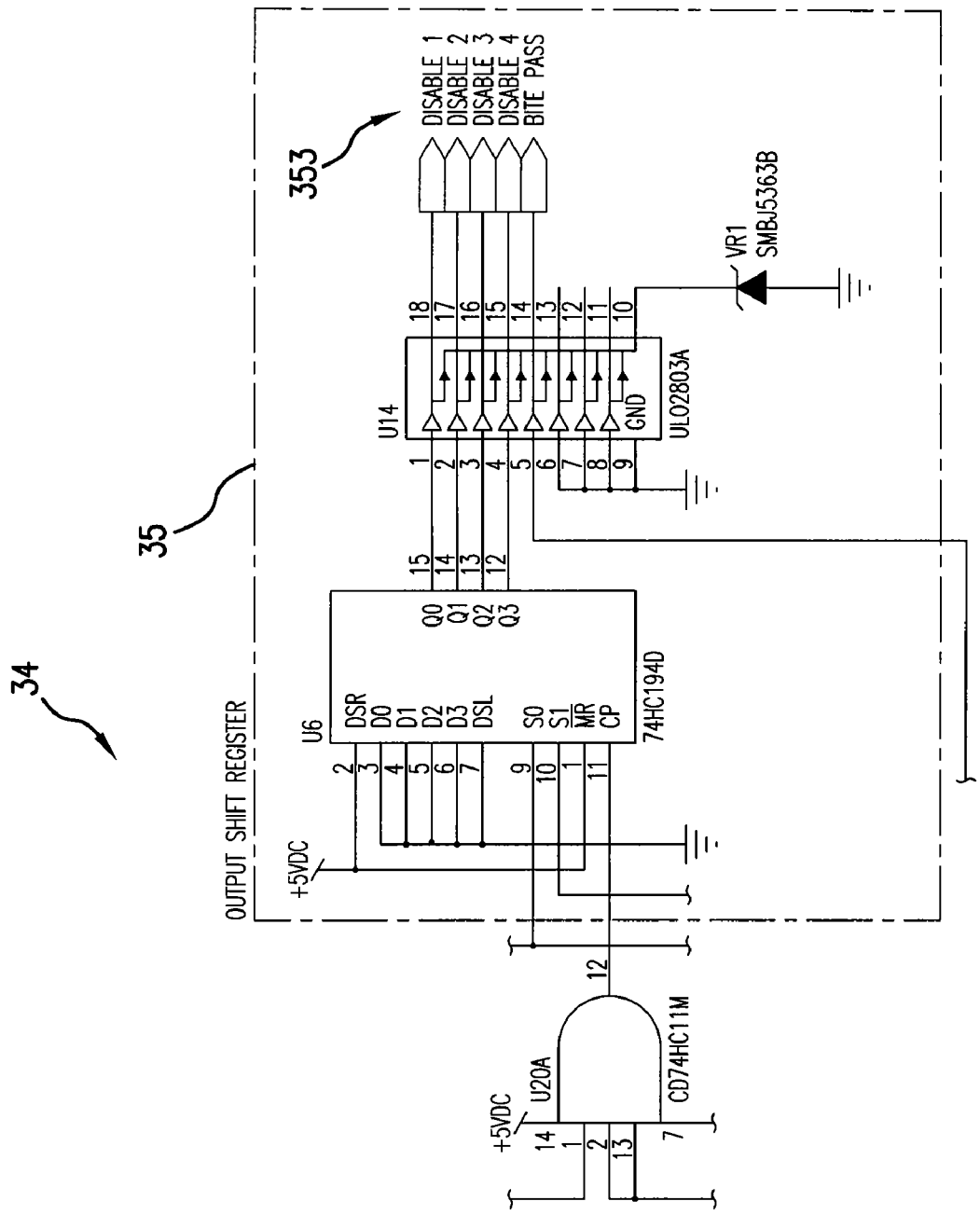
Figure 9:
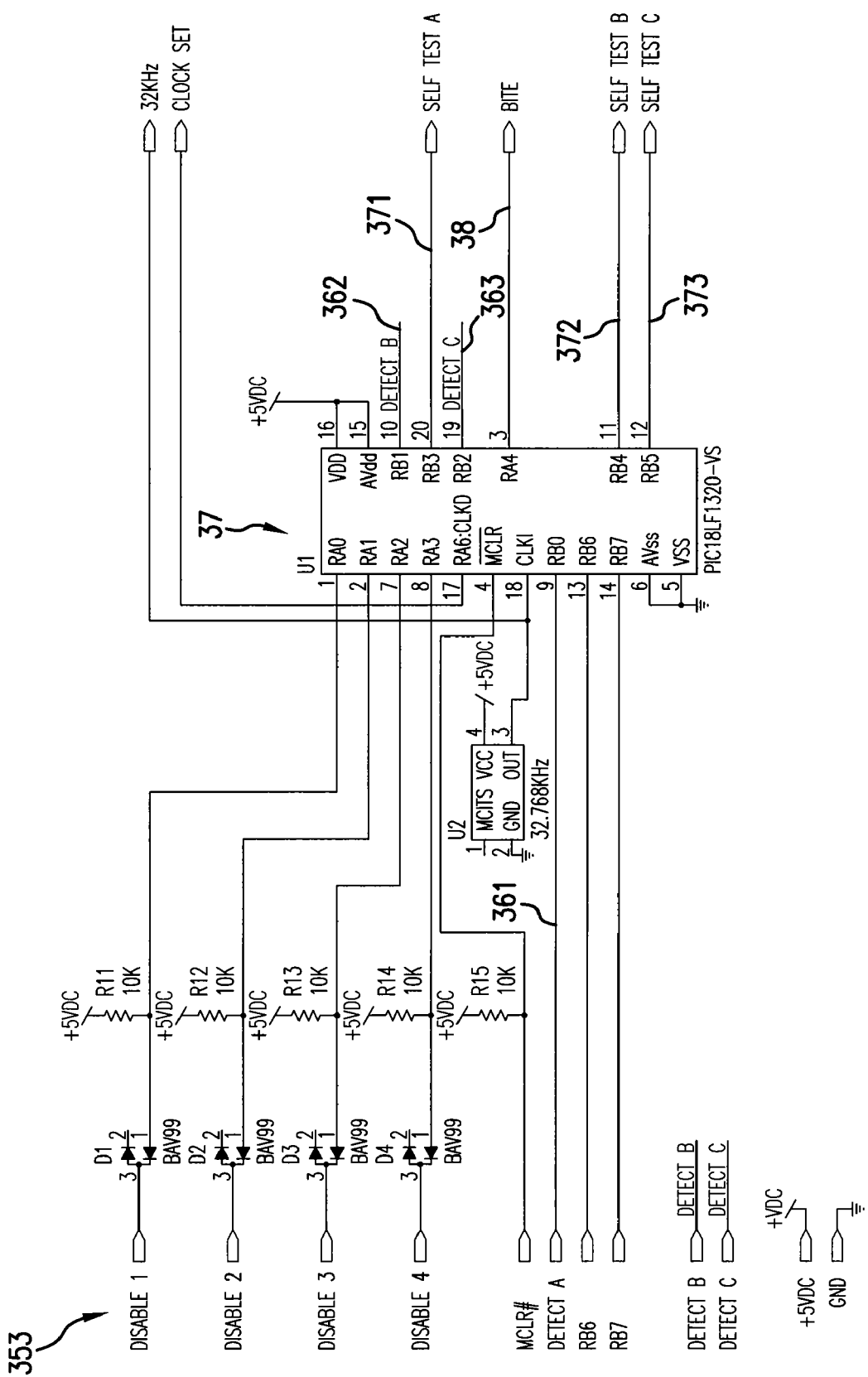
FIG. 9 is a schematic circuit diagram showing connections to a controller in an MMCU embodying the disclosure.

FIGS. 7-9 are schematic circuit diagrams for a phase modulation detector, a time control circuit and disable driver, and a microprocessor for performing the self-test, in accordance with particular embodiments of the disclosure. FIG. 7 (including connected diagrams FIGS. 7A-7C) shows how an AC scaling circuit 41, a 6th order filter 42, differentiator/amplifier circuit 43, absolute value amplifier 44 and modulation comparator 45 may be realized. FIG. 8 (including connected diagrams FIGS. 8A-8E) has schematic circuit diagrams for the timer control circuit 34 (including clock divider circuit 51, trigger circuit 52, and UP/DOWN counters 54, 55) and disable driver circuit 35. FIG. 9 shows a schematic diagram of connections to controller 37, including modulation detection outputs 361-363, self-test signals 371-373 and BITE signal 38.

Figure 10:
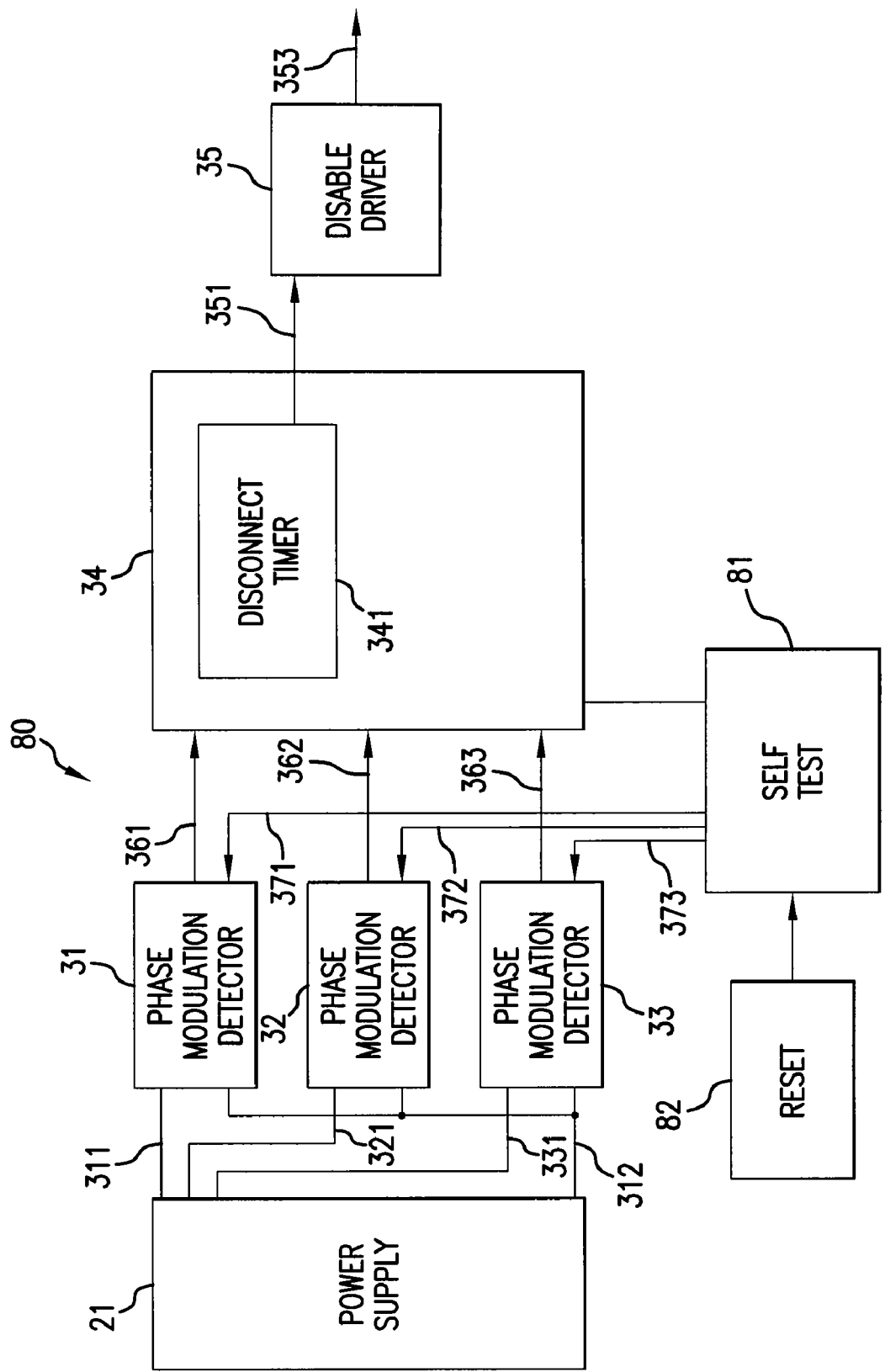
FIG. 10 is a schematic block diagram of a modulation monitor and control unit (MMCU) in accordance with another embodiment of the disclosure.

An alternative embodiment is shown schematically in FIG. 10. In the MMCU 80 of this embodiment, a programmable controller is not used (compare FIG. 3). A separate SELF TEST circuit 81, coupled to the timer control circuit, sends self-test signals to the phase modulation detectors in response to a signal from a RESET circuit 82. As in the previous embodiment, the self-test procedure may also be invoked upon activation of the system or in response to a command from a user of the system. The MMCU may also be configured without a reconnect feature, as shown in FIG. 10. In this embodiment, the MMCU disables (disconnects) loads successively at a preset disconnect interval to bring the modulation back below the threshold value, but does not automatically reconnect the loads.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

I claim:

1. A system comprising:
   a modulation monitor and control unit (MMCU) including
      a monitor configured to monitor loads on a power grid, the power grid having a plurality of connections including unused connections to which a load is not connected and used connections to which a load is connected;
      a detector configured to detect a modulation voltage on the power grid; and
      a controller configured to receive signals from the detector and to control connections to the power grid by
         outputting a disable signal to cause disabling of power to the unused connections in accordance with the detected modulation voltage exceeding a first threshold and disabling of power to the used connections in accordance with the detected modulation voltage exceeding a second threshold, the used connections being disabled one at a time at a first time interval each for a period given by a second time interval, and
         outputting a reenable signal to cause restoration of power to the used connections and to the unused connections in accordance with the detected modulation voltage being less than a third threshold.

2. A system according to claim 1, further comprising a closed-loop control device for the power grid, and wherein said controller is effective to maintain closed-loop control of the power grid by limiting the modulation voltage.

3. A system according to claim 1, wherein the controller includes a first timer for counting time in accordance with the first time interval, a second timer for counting time in accordance with the second time interval, and a trigger for triggering the first timer and the second timer in accordance with a signal from the detector.

4. A system according to claim 3, wherein the first time interval is in the range of 1 to 15 seconds, and the second time interval is in the range of 1 to 15 minutes.

5. A system according to claim 1, wherein the first threshold is approximately 2.6 VRMS, the second threshold is approximately 3.25 VRMS, and the third threshold is approximately 2 VRMS.

6. A system according to claim 1, wherein the system is installed on an aircraft, and the loads include resistive loads and reactive loads.

7. A system according to claim 6, wherein the controller is configured to output the reenable signal to cause restoration of power to used connections in reverse order relative to said connections having power disabled.

8. A system according to claim 1, further comprising a self-test device, connected to the detector and to the controller, for testing the system upon activation of the system or in response to a command from a user of the system.

9. A system according to claim 1, further comprising a 3-phase power supply connected to the power grid, and wherein the detector is configured to detect the modulation voltage for each of the phases.

10. A method comprising:
monitoring loads on a power grid, the power grid having a plurality of connections including unused connections to which a load is not connected and used connections to which a load is connected;
detecting a modulation voltage on the power grid
disabling power to the unused connections in accordance with the detected modulation voltage exceeding a first threshold and disabling power to the used connections in accordance with the detected modulation voltage exceeding a second threshold, the used connections being disabled one at a time at a first time interval each for a period given by a second time interval, and
restoring power to the used connections and to the unused connections in accordance with the detected modulation voltage being less than a third threshold,
thereby maintaining closed-loop control of the power grid.

11. A method according to claim 10, wherein the first threshold is approximately 2.6 VRMS, the second threshold is approximately 3.25 VRMS, and the third threshold is approximately 2 VRMS.

12. A method according to claim 10, wherein the first time interval is in the range of 1 to 15 seconds, and the second time interval is in the range of 1 to 15 minutes.

13. A method according to claim 10, wherein the power grid is installed on an aircraft, and the loads include resistive loads and reactive loads.

14. A method according to claim 13, wherein in said restoring step, power is restored to used connections in reverse order relative to said connections having power disabled in said disabling step.

15. A method according to claim 10, further comprising the step of performing a test procedure, using a self-test device, upon initiation of the method or in response to a command from a user.

16. A system comprising:
a power supply for delivering 3-phase power to a power grid, the power grid having a plurality of connections; and
a modulation monitor and control unit (MMCU) including
a monitor configured to monitor loads on the power grid, where said plurality of connections includes unused connections to which a load is not connected and used connections to which a load is connected;
a detector for detecting a modulation voltage in each of the phases, the detector receiving a voltage signal from the power supply for each of the phases and outputting a detection signal for each of the phases, the detector including a filter, an amplifier and a comparator configured to compare the modulation voltage with a threshold voltage;
a controller connected to the detector and configured to control connections to the power grid in accordance with the detection signal, the controller including
a device for disabling power to the unused connections in accordance with the detected modulation exceeding a first threshold, for disabling power to the used connections in accordance with the detected modulation exceeding a second threshold, and for restoring power to the used connections and to the unused connections in accordance with the modulation being less than a third threshold, said device including
a first timer device for counting time in increments of a first time interval,
a second timer device for counting time that power to a used connection is disabled in increments of a second time interval, and
a disable driver, connected to the first timer device and the second timer device, the disable driver outputting a disable signal to cause power to one used connection to be disabled per first time interval and outputting a re-enable signal to cause power to be restored to a used connection upon expiration of the second time interval, and
a trigger device for triggering the first timer device and the second timer device, the trigger device receiving inputs from the detector for each of the phases.

17. A system according to claim 16, wherein the first threshold is approximately 2.6 VRMS, the second threshold is approximately 3.25 VRMS, and the third threshold is approximately 2 VRMS.

18. A system according to claim 16, wherein the first time interval is in the range of 1 to 15 seconds, and the second time interval is in the range of 1 to 15 minutes.

19. A system according to claim 16, wherein the controller restores power to used connections in reverse order relative to said connections having power disabled.

20. A system according to claim 16, further comprising a self-test device, connected to the detector and to the controller, for testing the system upon activation of the system or in response to a command from a user of the system.

21. A system comprising:
a modulation monitor and control unit (MMCU) including
a monitor configured to monitor loads on a power grid, the power grid having a plurality of connections including unused connections to which a load is not connected and used connections to which a load is connected;
a detector configured to detect a modulation voltage on the power grid; and
a timer control circuit configured to receive signals from the detector and to control connections to the power grid by
causing power to the unused connections to be disabled in accordance with the detected modulation voltage exceeding a first threshold and
causing power to the used connections to be disabled in accordance with the detected modulation voltage exceeding a second threshold,
the used connections being disabled one at a time at a preset time interval.

22. A system according to claim 21, further comprising a closed-loop control device for the power grid, and wherein said controller is effective to maintain closed-loop control of the power grid by limiting the modulation voltage.

23. A system according to claim 21, wherein the timer control circuit includes a timer for counting time in accordance with the preset time interval, and a trigger for triggering the timer in accordance with a signal from the detector.

24. A system according to claim 23, wherein the preset time interval is in the range of 1 to 15 seconds.

25. A system according to claim 21, wherein the first threshold is approximately 2.6 VRMS, and the second threshold is approximately 3.25 VRMS.

26. A system according to claim 21, wherein the system is installed on an aircraft, and the loads include resistive loads and reactive loads.

27. A system according to claim 21, further comprising a self-test device, connected to the detector, for testing the system upon activation of the system or in response to a command from a user of the system.

28. A system according to claim 21, further comprising a 3-phase power supply connected to the power grid, and wherein the detector is configured to detect the modulation voltage for each of the phases.

\* \* \* \* \*